Aug. 14, 1956  W. J. D. VAN DIJCK  2,758,720
SEPARATION OF EMULSIONS BY FILTRATION
Filed June 29, 1953

Inventor:
Willem Johannes Dominicus van Dijck
By: Oswald H. Milmore
His Attorney

United States Patent Office

2,758,720
Patented Aug. 14, 1956

2,758,720

SEPARATION OF EMULSIONS BY FILTRATION

Willem Johannes Dominicus Van Dijck, The Hague, Netherlands, assignor to Shell Development Company, Emeryville, Calif., a corporation of Delaware Application June 29, 1953, Serial No. 364,739

7 Claims. (Cl. 210—149)

This invention relates to the filtration of emulsions for separating them into their constituent parts, and is more particularly concerned with an improved method and apparatus for separating emulsions, such as oil and water emulsions, employing a series of filter elements, such as screens, the surfaces of which have special properties permitting the emulsion to be broken. The invention is applicable to emulsions of various kinds, including particularly emulsions of oil and water such as refinery wastes, aqueous effluent such as condensate from oil-lubricated engines, etc., which may contain various impurities such as inorganic chemicals and wherein either the oil or the water may be the dispersed phase, the other being the continuous phase.

Crude oil in the natural state often contains a considerable proportion of water which must be removed before the oil can be refined. Water may also be introduced into refined oil during its transportation in pipe lines or other containers. Further, many of the waste effluents from various refinery and other unit operations contain both oil and water, and the aqueous wastes, such as condensates from oil-lubricated steam power units, pumps and the like, contain appreciable quantities of oil. Although oil and water are not directly soluble it is known that one of these is readily dispersed within the other in the form of masses or globules which may be separated under certain conditions by settling. Separation by settling, however, requires large settling ponds and a very extended time period is required in some instances, as when the dispersed phase consists of very fine bodies.

It has already been proposed to expedite the separation of oil from water in such emulsions by flowing the emulsion through one or successively through each of a series of screens. This effects a coalescence of the small globules that constitute the dispersed phase into larger goubles that are more readily settled by gravity or other means. A drawback of such known apparatus and methods has been that a considerable amount of pressure is required to force the emulsion through the screens; this not only requires the use of pumps and the expenditure of power, but also necessitates the use of filter elements that are sufficiently strong to withstand the force due to the pressure difference between the opposite sides of the screen that is inherently created when the emulsion is forced through the screen. A further drawback of this technique is that the effluent from such screens still contains both the water and the oil and must therefore be conducted to a settling tank or equivalent separator; in other words, the screen is merely an adjunct to a separating system and does not in itself separate the constituents of the emulsion.

It is an object of this invention to provide an improved method and apparatus for separating the constituents, e. g., oil and water, from their emulsions wherein a filter element is employed for effecting a primary separation of the emulsion into its constituents, whereby the need for an after-settler or separator is in many cases eliminated.

A further object is to provide an improved method and apparatus of the type indicated wherein filter elements are employed but the emulsion is not forced through the filter elements under appreciable pressure and need not, therefore, be pressurized, whereby pumping costs are eliminated or greatly reduced and filter elements of relatively lighter construction may be employed.

Still another object is to provide a method of breaking emulsions wherein the emulsion is subjected to a sequence of treatments in which the emulsion is enriched alternately with respect to the constituents thereof.

In summary, according to this invention, the emulsion is flowed in succession in contact with the upstream faces of filter elements, such as screens, sheets of fibrous or porous material, one filter element having a surface that is preferentially wetted by the first constituent of the emulsion in the presence of the second constituent of the emulsion and the other filter element having a surface that is preferentially wetted by the second constituent in the presence of the first constituent. In flowing in contact with the first-mentioned filter element a part of the first constituent of the emulsion flows through the filter element and is withdrawn from the downstream face of the filter element as a first filtrate that is substantially or entirely free from the second constituent, while the remaining part of the emulsion on the upstream face of the filter element is enriched in the second constituent and flows off as a first filtration residue. While this residue flows in contact with the second-mentioned filter element a portion of the second constituent flows through the filter element and is withdrawn from the downstream face as a second filtrate that is substantially or entirely free from the first constituent, while the remaining part of the emulsion on the upstream face of the filter element flows off as a second filtration residue enriched in the first constituent. The second filtration residue may be further treated by being again passed in contact with filter elements of the two types in the manner described above; this may be effected either by providing additional filter elements that are alternately of the two types mentioned, or by returning the second filtration residue to the first-mentioned filter element, or by a combination of these techniques, as described in detail hereinafter.

It will be understood that the expression "upstream face" is used herein to denote the surface of the filter element at which the filtrate enters the filter element, and the expression "downstream face" is used to denote the surface at which the filtrate leaves the filter element; these surfaces need not be regular or parallel geometric surfaces as in the case of screens but may be the boundaries of granular beds or other filter elements.

In flowing the emulsion in contact with the filter the emulsion flows as a comparatively thin layer, e. g., from one tenth of an inch to two inches in thickness, depending upon the sizes of the openings of the filter and the nature of the emulsion so as to avoid any great pressure difference between opposite faces of the filter such as would cause both constituents to flow through the said openings and, further, to insure good contact with the filter. In most cases it is preferred to flow the emulsion first in contact with a filter that is preferentially wetted by the constituent that occurs as the continuous phase in the initial emulsion; this is not, however, an absolute requirement. A reasonably slow rate of flow is preferred and this can be facilitated, when gravity flow is used, by mounting the screens on an incline. However, the invention is not limited to gravity flow over inclined filters; the emulsion can, for example, be confined in a compartment the bottom of which is constituted by a series of moving screen or equivalent filters mounted on a translatable or rotatable frame in a continuous or reciprocating manner so as to place the bottom of the body of emulsion alternately in contact with the two types of filters mentioned above. Moreover, the flow of the filtrate through the emulsion need not be downward; instead, the emulsion can be pressed with a gentle pressure against a filter situated to one side of or above the emulsion.

In the preferred embodiment of the invention a sufficiently long series of filters is provided so that the emulsion, in flowing successively in contact with the filters of the series, is repeatedly enriched with respect to the second constituent in alternation with enrichments with respect to the first constituent; thus the series may include two to ten filters of each of the two types mentioned, arranged in alternation, whereby all or substantially all of the emulsion is eventually passed through the filters as filtrate; the final residual filtration residue, if any, may then be returned to a prior filter, e. g., the first in the series or, should it contain constituents making the complete breaking of the emulsion by the use of such filters impracticable, it may be withdrawn from the process and subjected to a special chemical or heat treatment. The several filtrates of the same constituent may be collected to form two composite filtrates.

In the case of oil and water emulsions it is convenient to refer to the filter elements that are preferentially wetted by water in the presence of oil as hydrophilic and to those that are preferentially wetted by oil in the presence of water as hydrophobic, and this usage, although not rigidly exact, is employed in the sequel.

The invention will be further described in detail with reference to the accompanying drawing, illustrating one preferred embodiment of the invention by way of illustration, wherein.

Figure 1:
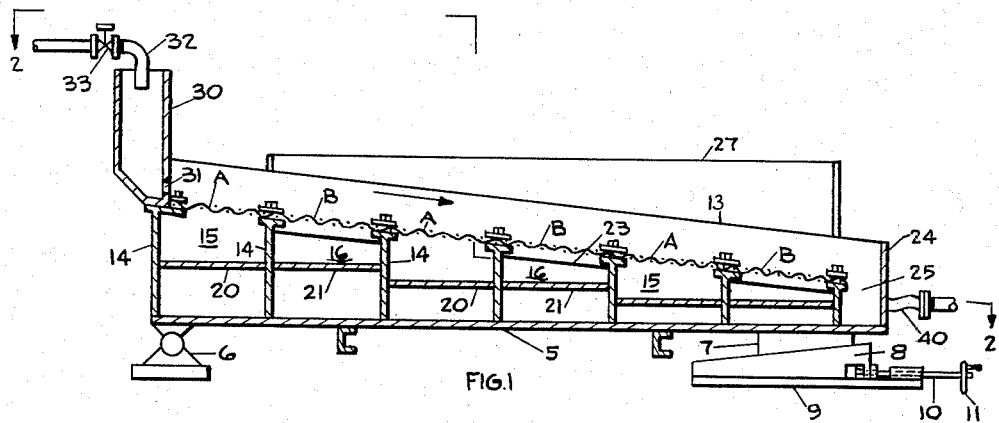
Figure 1 is a vertical longitudinal section view through the apparatus suitable for carrying out the process, taken on the line 1—1 of Figure 2.

The apparatus may conveniently be arranged as a box-like structure 5 that is tiltable as a whole to vary the inclination of the filter elements. To this end the structure has a pivotal support, such as a pair of bearing blocks 6, at one end and a suitable vertically adjustable support at the other end, digrammatically represented by a wedge device that includes a first wedge 7 fixed to the structure 5 and a longitudinally adjustable wedge 8 that slides on a stationary base 9 and can be positioned by a screw 10 carrying a handwheel 11.

Figure 2:
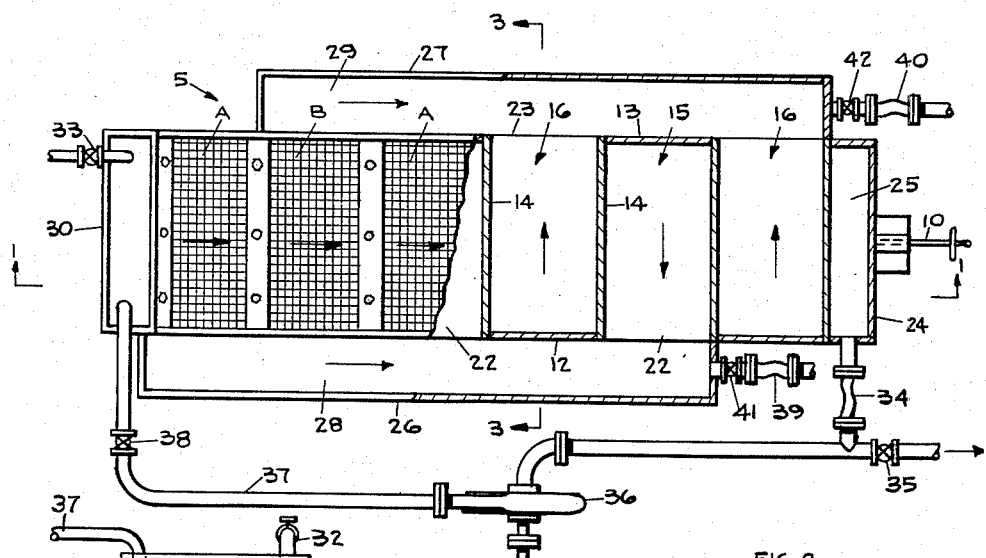
Figure 2 is a horizontal section view taken in broken line 2—2 of Figure 1.
Figure 3:
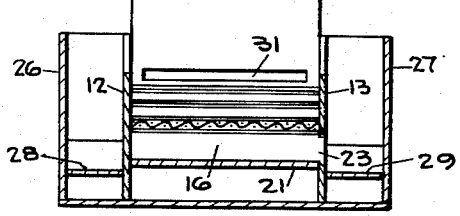
Figure 3 is a transverse section view taken on line 3—3 of Figure 1.
Figure 4:
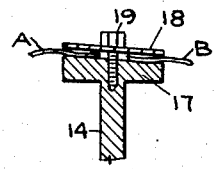
Figure 4 is a fragmentary detail view in section of the screen attachment.

The structure 5 has a pair of longitudinal walls 12 and 13 between which are a plurality of transverse partition walls 14 that subdivide the space between the walls into compartments alternately designated by the numbers 15 and 16. These walls further serve to support the filter screens and to this end they have slightly inclined flanges 17 that are situated well below the upper edges of the walls 12 and 13, said edges being indicated as sloping downwardly from the upstream to the downstream end of the structure. The filter elements are constituted by screens A and B situated over the compartments 15 and 16, respectively, supported by the flanges 17 and secured by thin cleats 18 and bolts 19. The parts of the walls above the screens form side walls for a flow channel. The compartments 15 and 16 have floors 20 and 21, respectively, that may slope downwardly toward the sides indicated by the arrows in Figure 2, and the side walls 12 and 13 have openings extending upwardly from these floors to levels beneath the screens, as follows: The wall 12 has an opening 22 at each compartment 15 and the wall 13 has an opening 23 at each compartment 16. A transverse wall 24 at the downstream end of the series of compartments defines a terminal collecting trough 25. Lateral galleries or collecting troughs are formed by outer side walls 26 and 27 and floors 28 and 29 that may be inclined downwardly in the directions indicated by the arrows in Figure 2 to insure drainage of liquid from the compartments 15 and 16 toward the right end of the apparatus, respectively, regardless of the adjustment of the wedge 8.

Alternate screens A are made of or coated with a substance that is preferentially wetted by water in the presence of oil, such material being herein called a hydrophilic material. Metals, when metallurgically clean, are hydrophilic and the screen A may be made of metal and maintained in a hydrophilic state by frequent cleaning, for example with aqueous solutions of inorganic acids such as phosphoric acid, hydrochloric acid or sulfuric acid, and the like, or solutions containing trisodium phosphate. Filter elements may also be made of metals coated with unglazed ceramic or glass or with cellulose fibers; or they may be made entirely of such materials.

The intervening screens B are made of or coated with a substance that is inherently preferentially wetted by oil in the presence of water, such material being herein called a hydrophobic material. Examples are polytetrafluoroethylene, commercially available under the trademark Teflon, methyl silicone coatings, which may be applied as a varnish and baked, carbon and graphite, sulfides and certain metal soaps, such as oleyl ester of phosphoric acid.

Typical filter screens may be from about 8 to 150 mesh, i. e., may have openings from about 0.003 to 0.07 inch.

The apparatus is further provided with a distribution trough 30 having a restricted, transversely elongated outlet 31 through which the emulsion to be separated is fed onto the first screen A. Fresh emulsion is admitted to the trough through a pipe 32 at a rate controlled by a valve 33. Filtration residue, if any, running off from the last screen B and collected in the terminal trough 25 is drained through a flexible drawoff line 34 from which the unfiltered material may be selectively withdrawn through a valve 35, or passed through a centrifugal pump 36 to a return line 37 by which it is recycled to the supply trough 30 at a rate controlled by a valve 38. Flexible drains 39 and 40, having valves 41 and 42, communicate with the low ends of the lateral collecting troughs. While flexible drains, such as hose, may be used at 34, 39 and 40, other mechanical arrangements permitting the structure 5 to be moved may be employed, as will be apparent to those skilled in the art.

In operation, the emulsion to be separated, for example a water in oil emulsion, is supplied through the pipe 32 at a rate controlled by the valve 33 such as to cause a thin layer of the emulsion to flow over the screens in succession. This layer may, for example, be from one tenth to two inches in height at the upstream filter element A. An excessively thick layer of the emulsion is avoided so as to prevent a hydrostatic pressure on the filter sufficient to force oil through the interstices of the hydrophilic screen A or to force water through the hydrophobic screens B. The inclination of the screens is adjusted by means of the handwheel 11 and wedges 8 and 9, if necessary, to maintain the desired rate of liquid flow. In flowing over the first screen A, a part of the water in the emulsion drains through the filter and into the first compartment 15 as a substantially oil-free filtrate and the emulsion on the top of the screen runs off as a filtration residue that is enriched in oil. This oil-enriched emulsion thereupon passes over the hydrophobic screen B as a thin layer as described for the first screen. A portion of the oil contained therein drains through the interstices of the screen and into the first compartment 16, leaving a water-enriched filtration residue on the upper side of the screen; the latter runs off on to the next hydrophilic screen A. This sequence of operations is repeated until all or substantially all of the emulsion has drained into the compartments 15 and 16. Should the rate of admission of the emulsion from the trough 30 have been too high to permit total drainage through the screens, or should the emulsion contain constituents that are too difficult to separate by this technique, there will be an overflow from the last screen, which passes into the terminal catch-trough 25 for withdrawal from the system through the valve 35 or return to the distributing trough 30 via the pump 36. The several aqueous filtrates from the compartments 15 are collected in the lateral collecting trough bounded by the walls 12 and 26 and withdrawn through the drain 39, while the several oleaginous filtrates from the compartments 16 are collected in the lateral collecting troughs bounded by the walls 13 and 27 and withdrawn through the drain 40.

I claim as my invention:

1. Apparatus for separating emulsions into their constituent liquids by filtration comprising: a series of inclined filters disposed for the flow of said emulsion in contact successively with said filters, alternate filters being preferentially wetted by one of said constituents of the emulsion in the presence of the other constituent and the intervening filters being preferentially wetted by said other constituent in the presence of said one constituent; means for feeding said emulsion to the first filter of said series; channel means for leading the entire filtration residue from each of said alternate filters to the following intervening filter through each successive pair of alternate and intervening filters in said series; and means for collecting the filtrates of said alternate screens separately from the filtrates of said intervening screens.

2. In combination with the apparatus according to claim 1, means for returning filtration residue from a filter subsequent to the first filter of the series to said first filter.

3. Apparatus according to claim 1 wherein said filters are inclined screens.

4. Apparatus for separating water and oil from an emulsion thereof comprising: a series of inclined filters disposed for the flow of said emulsion in contact successively with the upper faces of said filters, alternate filters being hydrophilic and the intervening filters being hydrophobic, said hydrophilic filters being preferentially wetted by water in the presence of oil and said hydrophobic filters being preferentially wetted by oil in the presence of water; means for feeding said emulsion to a filter at the first filter of said series; channel means for leading the entire filtration residue from each of said alternate filters to the following intervening filter through each successive pair of alternate and intervening filters in said series; and means for collecting the filtrates of said hydrophilic filters separately from the filtrates of said hydrophobic filters.

5. Apparatus according to claim 4 wherein said filters have inclined upper faces and the said means for feeding emulsion includes a flow control device for regulating the rate at which the emulsion is fed to the screens, whereby the thickness of the layer of the emulsion that flows over said filters can be regulated.

6. In combination with apparatus according to claim 4, collecting means for collecting filtration residue from the last filter in said series and means for returning filtration residue from said collecting means to a prior filter of said series.

7. Apparatus according to claim 4 wherein said filters are angularly adjustable, whereby the inclination of the upper faces of the filters can be varied to control the rate of runoff of the emulsion over the upper faces of the filters.

References Cited in the file of this patent

UNITED STATES PATENTS

| | | |
|---|---|---|
| 1,320,324 | Dunkle | Oct. 28, 1919 |
| 1,524,916 | Demme | Feb. 3, 1925 |
| 2,158,169 | Wright | May 16, 1939 |
| 2,404,872 | Walker | July 30, 1946 |
| 2,415,268 | Wendt | Feb. 4, 1947 |
| 2,555,607 | Robinson | June 5, 1951 |
| 2,638,226 | Cowan et al. | May 12, 1953 |